United States Patent
Poelker et al.

(10) Patent No.: US 6,855,672 B2
(45) Date of Patent: Feb. 15, 2005

(54) COPOLYMERS USEFUL FOR GELLING ACIDS

(75) Inventors: David J. Poelker, Missouri City, TX (US); JoAnn McMahon, Arnold, MO (US); Dee Harkey, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 222 days.

(21) Appl. No.: 10/045,221

(22) Filed: Nov. 7, 2001

(65) Prior Publication Data

US 2003/0104948 A1 Jun. 5, 2003

(51) Int. Cl.⁷ .............................................. E21B 43/16
(52) U.S. Cl. ..................... 507/225; 507/222; 507/224; 507/903; 507/923; 507/933; 166/308.2; 166/308.5; 166/307
(58) Field of Search ................ 507/120, 225, 507/933, 222, 224, 903, 923; 166/308, 308.2, 308.5, 307; 524/829, 831; 526/304, 306, 307, 318.1

(56) References Cited

U.S. PATENT DOCUMENTS

| | | | | |
|---|---|---|---|---|
| 3,839,500 A | * | 10/1974 | Dexter | 524/377 |
| 4,024,040 A | * | 5/1977 | Phalangas et al. | 522/27 |
| 4,152,274 A | * | 5/1979 | Phillips et al. | 507/222 |
| 4,507,440 A | * | 3/1985 | Engelhardt et al. | 525/218 |
| 4,514,551 A | * | 4/1985 | Furuno et al. | 526/233 |
| 4,515,635 A | | 5/1985 | Rao et al. | 106/90 |
| 4,536,303 A | | 8/1985 | Borchardt | 252/8.55 R |
| 4,554,081 A | | 11/1985 | Borchardt et al. | 252/8.5 A |
| 4,555,269 A | | 11/1985 | Rao et al. | 106/90 |
| 4,558,741 A | * | 12/1985 | Borchardt et al. | 166/275 |
| 4,563,292 A | | 1/1986 | Borchardt | 252/8.55 R |
| 4,588,508 A | * | 5/1986 | Allenson et al. | 210/708 |
| 4,626,363 A | * | 12/1986 | Gleason et al. | 507/118 |
| 4,669,722 A | * | 6/1987 | Rangaswamy | 482/79 |
| 4,730,081 A | | 3/1988 | Holtmyer et al. | 560/222 |
| 4,767,550 A | | 8/1988 | Hanlon et al. | 252/8.551 |
| 4,780,221 A | * | 10/1988 | Holtmyer et al. | 507/225 |
| 4,783,513 A | * | 11/1988 | Cadel et al. | 526/216 |
| 4,980,437 A | * | 12/1990 | Kaussen et al. | 526/307 |
| 5,652,296 A | * | 7/1997 | Randen | 524/547 |
| 5,698,627 A | * | 12/1997 | Oguni et al. | 524/724 |
| 5,701,955 A | | 12/1997 | Frampton | 166/295 |
| 5,717,045 A | * | 2/1998 | Tseng | 526/264 |
| 5,795,926 A | * | 8/1998 | Niessner et al. | 523/339 |
| 5,975,206 A | | 11/1999 | Woo et al. | 166/300 |
| 6,046,140 A | | 4/2000 | Woo et al. | 507/204 |
| 6,053,246 A | | 4/2000 | Echols et al. | 166/278 |
| 6,189,615 B1 | | 2/2001 | Sydansk | 166/270 |
| 6,207,620 B1 | | 3/2001 | Gonzalez et al. | 507/277 |

FOREIGN PATENT DOCUMENTS

| | | | |
|---|---|---|---|
| DE | 2912326 | * | 10/1980 |
| EP | 311904 | * | 10/1988 |
| JP | 04-11095 | * | 1/1992 |
| JP | 06-80737 | * | 3/1994 |

OTHER PUBLICATIONS

Lewis R. Norman et al.; *Temperature Stable Acid Gelling Polymers. Laboratories Evaluation and Field Results,* SPE 10260, 56th Annual Fall Technical Conference and Exhibition of the Society of Petroleum Engineers of AIME, Oct. 5–7, 1981, pp. 1–4, 3 Tables, 8 Figures.

* cited by examiner

*Primary Examiner*—Philip C. Tucker
(74) *Attorney, Agent, or Firm*—Madan, Mossman & Sriram, P.C.

(57) ABSTRACT

Disclosed is a copolymer useful for preparing acid gels comprising a copolymer having a copolymer backbone, the copolymer having a general formula:

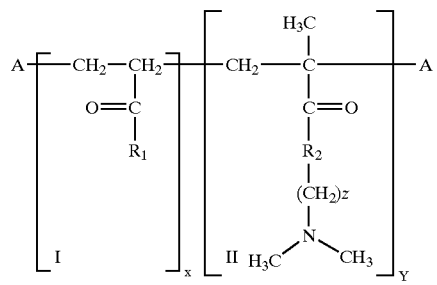

wherein: (a) A is an H or other terminating group; (b) $R_1$ is an OH or $NH_2$; (c) $R_2$ is an O or NH; (d) Z is an integer having a value of from 1 to 4; (e) X and Y are present in a ratio (X:Y) of from 3:2 to 4:1; (f) structures I and II are present as blocks or randomly distributed along the copolymer backbone; and wherein the copolymer has a molecular weight of from about 1,000,000 to about 10,000,000.

14 Claims, No Drawings

COPOLYMERS USEFUL FOR GELLING ACIDS

BACKGROUND OF THE INVENTION

1. Field of the Invention

The present invention relates to copolymers useful for oil and gas production. The present invention particularly relates to copolymers useful for oil and gas production as acid gelling agents.

2. Background of the Art

The use of acid gels for the practice of acidizing oil and gas wells is well known. Acidizing, a procedure used to stimulate oil and gas production, is carried out by injecting a well servicing fluid, for example, a dilute solution of an acid such as hydrochloric acid, into a producing subterranean formation. The acid enters flow channels, such as cracks or fissures present in the formation, and enlarges the flow channels through which the oil or gas passes to the well bore, thereby increasing the production of the well. Matrix acidizing is carried out under relatively low pressure to enlarge or unplug existing channels by action of the acid against formations such as limestone. Fracture acidizing involves injection of the well servicing fluid under relatively high pressure to crack open existing fissures to create wider channels.

Regardless of the type of acidizing, it is desirable to incorporate a viscosifier into the fluid to enable injection of the fluid to smaller fissures as well as more open areas. The well servicing fluids including a viscosifier are often referred to as gels or fracture gels. In addition, with respect to fracture acidizing, a proppant such as sand is typically used. The viscosity of the gel functions to to keep the proppant suspended in the fluid during injection into the well being treated.

The polymers commonly used to gel acids for acidizing oil and gas wells include both natural and synthetic polymers. The natural polymers include the so called polysaccharide biopolymers. The synthetic polymers include those such as are taught in U.S. Pat. No. 5,975,206 to WOO, et al., hereinafter WOO. WOO discloses a crosslinked acid gel comprising an emulsion copolymer and an external activator and methods for acid fracturing subterranean formations using the crosslinked acid gels.

While other synthetic polymers, such as polyethers prepared with ethylene oxide or propylene oxide condensate backbones, can used for gelling acids, polymers having vinyl backbones are commonly used. For example, polymers prepared using the quaternary amine salts of dimethylaminoethyl methacrylate have been disclosed as suitable for gelling acids. Temperature Stable Acid Gelling Polymers, Norman, L. R.; Conway, M. W.; and Wilson, J. M., SPE 10260 presented during the 56$^{th}$ annual fall technical conference of the Society of Petroleum Engineers, San Antonio, Tex., Oct. 5–7, 1981.

The polymers described above are used to gel acids. Acid systems currently in use for acidizing oil and gas wells can be broadly classified into the following groups: mineral acids which includes hydrochloric acid, hydrofluoric acid and mixtures of hydrochloric-hydrofluoric acid; organic acids which include formic acid; and acetic acid; powdered solid acids such as sulfamic acid, and chloroacetic acid; mixed acid systems such as acetic-hydrochloric acid, formic-hydrochloric acid; formic-hydrofliuoric acid; retarded acid systems for example gelled acids, chemically retarded acids, and emulsified acids.

It would be desirable in the art of preparing and using acid gels in the field of oil and gas production to prepare such gels which have lower toxicity than conventional acid gels. If would also be desirable in the art if the gels had performance properties similar to conventional acid gels.

SUMMARY OF THE INVENTION

In one aspect, the present invention is a copolymer useful for preparing acid gels comprising a copolymer having a copolymer backbone, the copolymer having a general formula:

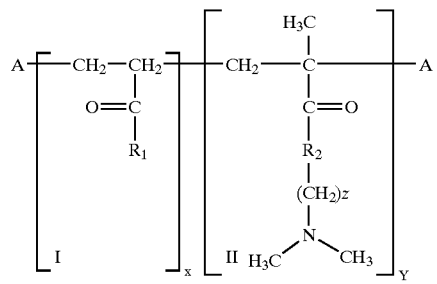

wherein: (a) A is an H or other terminating group; (b) $R_1$ is an OH or $NH_2$; (c) $R_2$ is an O or NH; (d) Z is an integer having a value of from 1 to 4; (e) X and Y are present in a ratio (X:Y) of from 3:2 to 4:1; (f) structures 1 and 11 are present as blocks or randomly distributed along the copolymer backbone; and wherein the copolymer has a molecular weight of from about 1,000,000 to about 10,000,000.

In another aspect, the present invention is a gelled acid comprising an acid gelled using a copolymer having a backbone, the organic component of the gelled acid having the general formula:

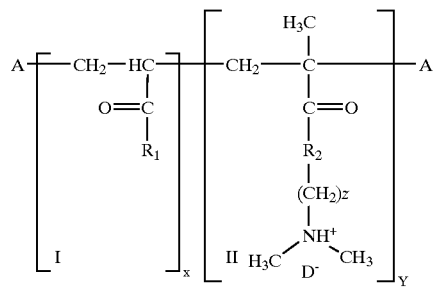

wherein: (a) A is an H or other terminating group; (b) $R_1$ is an OH or $NH_2$; (c) $R_2$ is an O or NH; (d) Z is an integer having a value of from 1 to 4; (e) X and Y are present in a ratio (X:Y) of from 3:2 to 4:1; (f) structures 1 and 11 are present as blocks or randomly distributed along the copolymer backbone; (g) D$^-$ is an anion of a mineral acid; and wherein the gelled acid has a molecular weight of from about 1,000,000 to about 10,000,000.

Another aspect of the present inventions is a method for fracturing a subterranean formation, the subterranean formation being in fluid communication with the surface through a well bore, comprising:

(a) creating a fracture in a subterranean formation; and (b) injecting into the fracture an etching agent, wherein the etching agent includes a gelled acid comprising an acid gelled using a copolymer having a backbone, the gelled acid having the general formula:

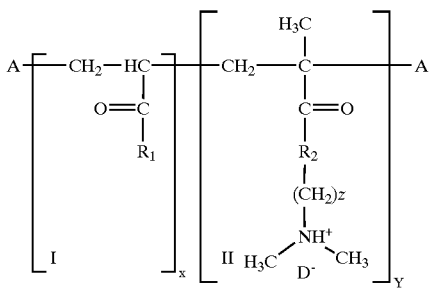

wherein: (a) A is an H or other terminating group; (b) R, is an OH or $NH_2$; (c) $R_2$ is an O or NH; (d) Z is an integer having a value of from 1 to 4; (e) X and Y are present in a ratio (X:Y) of from 3:2 to 4:1; (f) structures 1 and 11 are present as blocks or randomly distributed along the copolymer backbone; (g) D is an anion of a mineral acid; and wherein the gelled acid has a molecular weight of from about 1,000,000 to about 10,000,000.

In still another aspect, the present invention is a copolymer formulation useful for preparing copolymers useful for gelling acids comprising:

(a) a first vinyl component selected from the group consisting of acrylamide, acrylic acid, dimethylethyl acrylate, and mixtures thereof; and (b) a second vinyl component selected from dimethylaminoethyl methacrylate, dimethylaminoethyl methacrylamide, dimethylaminopropyl methacrylamide, and mixtures thereof.

Another aspect of the present invention is a method for preparing an acid gel including admixing a vinyl compound having an amine group with an acid to form a salt and polymerizing the salt in the presence of another different vinyl compound to form a copolymer, the improvement comprising selecting as the vinyl compound having an amine group only such vinyl compounds having an amine group as will form an amine salt with the acid.

DETAILED DESCRIPTION OF THE PREFERRED EMBODIMENTS

In one embodiment, the present invention is a gelled acid. Gelled acids are useful as well servicing fluids in, for example, acid fracturing. Acid fracturing is well known in the art of oil and gas production and is taught in references such as U.S. Pat. No. 6,207,620 B1 to Gonzalez, et al. Gelled acids can also be used for other types of acidizing which are done without concurrent fracturing. In either case, the goal of acidizing is to increase production of oil and gas.

Increased production of oil and gas, also known as well stimulation, is achieved by either creating a flow path through a damaged zone around a well bore or by altering the flow pattern in a reservoir. Typically small volume acid treatments can overcome well bore damage and restore native productivity to a well by removing flow restrictions caused by a zone of low permeability near the wellbore. However in order to alter the flow pattern in the reservoir, a much larger volume acid treatment process is typically required.

While many kinds of acid are used in acidizing oil and gas wells, the preferred acids for use with the present invention are mineral acids. The so called mineral acids include: sulfuric, nitric, hydrochloric, and phosphoric acid. Preferably, the acids used with the present invention include sulfuric, nitric, and hydrochloric acid. Most preferably, the acids used with the present invention include sulfuric and hydrochloric acid.

In one embodiment of the present invention, a first vinyl compound having an amine group is admixed with a mineral acid and then that admixture is further admixed with a second vinyl material to form a copolymer useful for preparing a gelled acid. Preferably, the first vinyl material has the general formula:

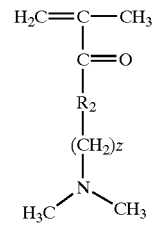

wherein $R_2$ is an O or NH, and Z is an integer having a value of from 1 to 4. Preferably $R_2$ is an 0. Preferably Z has a value of from 2 to 3. Most preferably Z has a value of 2. Exemplary materials include dimethylaminoethyl methacrylate, dimethylaminoethyl methacrylamide, dimethylaminoproply methacrylamide, and the like.

Preferably, the first vinyl material is combined with an acid under conditions sufficient to from an amine salt, but not cause autopolymerization or hydrolysis. For example, the first material can be combined very slowly with sulfuric acid and ice to form an aqueous amine salt. In the method of the present invention, the combination of the acid with the first vinyl compound can be practiced in any way which will give rise to the amine salt with minimal auto polymerization of the vinyl material known to those of ordinary skill in the art of preparing vinyl copolymers.

The second vinyl material preferably has the general structure:

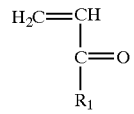

wherein $R_1$ is an OH or $NH_2$ or any group which can give rise to an OH or $NH_2$ in the presence of a strong acid. Exemplary materials include acrylamide, dimethylethyl acrylate, and acrylic acid. Preferably, the second vinyl material is dimethylethyl acrylate. This material is preferably combined with the amine salt under reaction conditions to form a copolymer useful for preparing a gelled acid.

The copolymers of the present invention have the general formula:

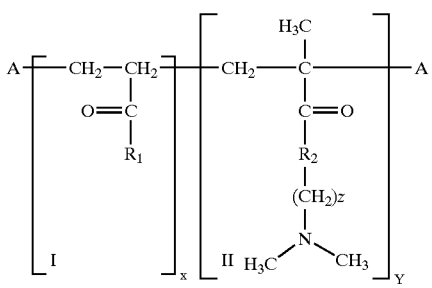

and when used to prepare a gelled acid of the present invention, a copolymer of the present invention is admixed with a mineral acid to form an amino salt. The result is a gelled acid wherein the organic component of the gelled acid has the general formula:

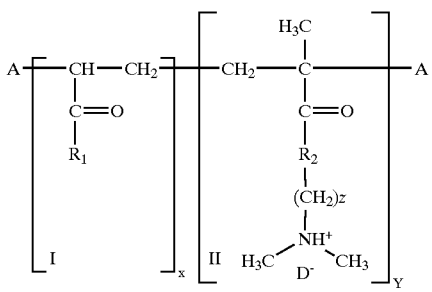

wherein: (a) A is an H or other terminating group; (b) $R_1$ is an OH or $NH_2$; (c) $R_2$ is an O or NH; (d) Z is an integer having a value of from 1 to 4; (e) X and Y are present in a ratio (X:Y) of from 3:2 to 4:1; (f) structures 1 and 11 are present as blocks or randomly distributed along the copolymer backbone; (g) $D^-$ is an anion of a mineral acid; and wherein the gelled acid has a molecular weight of from about 1,000,000 to about 10,000,000. In the acid gel, the copolymer is suspended in a continuous phase of the acid or an acid mixture imparting substantial increased viscosity to the acid. Not shown in the formula is the remainder of the mineral acid, HD.

The copolymers of the present invention can also be prepared using crosslinking agents. The copolymers of the present invention are substantially linear. A crosslinking agent, for purposes of the present invention, is any material which can be incorporated into the polymer to create links from one is linear segment to another. Care should be used when including crosslinkers into the formulations of the present invention because their inclusion can cause extremely rapid molecular weight growth and produce polymers which are not good gelling agents for acids.

Exemplary crosslinking agents include bis-acrylamide, and the like. When used with the formulations of the present invention, the crosslinking agents are preferably present in a concentration of less than about 250 parts per million, hereinafter ppm. More preferably the crosslinking agents are present in a concentration of less than about 200 ppm and most preferably less than about 100 ppm.

In the general formulae, the copolymers of the present invention are shown as being in a head to tail arrangement. This head to tail arrangement is believed to be the predominant structure for the polymers of the present invention and is preferred. That preference notwithstanding, the copolymers of the present invention can be of any arrangement as long as they function to gel acid.

In a preferred embodiment, the copolymers of the present invention are prepared and used in the field in the form of an inverse emulsion copolymer. In this form, the hydrophilic copolymers are suspended as droplets or particles in a hydrophobic medium. The copolymers of the present invention can also be used where the copolymer is suspended in an aqueous continuous phase. The formulations for the copolymers of the present invention can include other materials which can aid in the formation of dispersions and also increase or improve the compatibility of the acid gels with other materials which may be present during their use.

Additives which can be used with the formulations of the present invention include, but are not limited to, emulsifiers, chelators, surfactants, proppants, delay additives, biocides, corrosion inhibitors, and the like.

The copolymers of the present invention are admixed with mineral acids to form acid gels. It is desirable in the art of producing oil and gas to minimize both the amount of copolymer used and the handling of the copolymer using the acid gels of the present invention in the production of oil and gas. Preferably, the copolymers of the present invention are admixed with an acid using the impeller of a pump which then pumps the viscosified acid into the well. In an alternative embodiment, the acid and copolymer can be first admixed and then, in a separate step, pumped into an oil and gas well.

The copolymers of the present invention are prepared using amines rather than amine derivatives such as quaternary ammonium salts. It has been surprisingly found that the copolymers of the present invention, after use and neutralization, are less toxic to marine life than the otherwise similar copolymers prepared using quaternary ammonium salts.

The copolymers of the present invention can also serve other function in well servicing fluids besides just being a means to gel acid. A small concentration of the copolymers of the present invention can also be in other well servicing fluids as a friction reducer. Such fluids typically are aqueous, but may contain small amounts of crude or other oils. It is believed that a small amount of the copolymers of the present invention can reduce friction by dampening turbulence in the flow of the fluid.

EXAMPLES

The following examples are provided to illustrate the present invention. The examples are not intended to limit the scope of the present invention and they should not be so interpreted. Amounts are in weight parts or weight percentages unless otherwise indicated.

Example 1

An inverse emulsion copolymer is prepared by admixing the oil soluble components listed below in Table I in the order shown. The polymeric stabilizing surfactant requires warming to 40C to melt it and thus solubilize it. Otherwise, the other components are added at ambient conditions. The admixture is then placed in a 2-quart pressure reactor.

The water-soluble components shown in Table I are admixed in the order shown and adjusted to pH 4 with concentrated sulfuric acid.

The aqueous phase is then slowly added to oil phase with vigorous mixing to prepare an inverse emulsion (oil external). The emulsion is homogenized with a Brinkman Polytron benchtop homogenizer for four minutes at the 5/10 setting.

The emulsion is then warmed to 42° C. with a nitrogen gas sparge to remove oxygen from the reactor. After 30 minutes the sparge is discontinued and a 10 psi nitrogen gas overpressure is established. The temperature is gradually raised to 70° C. to convert any residual monomer to polymer.

The emulsion is tested for hydrolysis of the copolymer by titration of acid and the results are shown below in Table II.

The emulsion is also tested for viscosity. Using a suitable measuring cylinder 500 ml of 15.0% Hydrochloric Acid is measured into a clean and dry 600-ml capacity short form beaker. A three bladed 'turbine' propeller stirrer shaft, which is driven by a TEKMAR RW20 DZM-stirrer, is introduced into the acid ensuring that the propeller is immersed at the same level each time the test is repeated (the shaft is marked at the fluid level). The stirrer is initiated and set at a speed of 275 rpm (+ or −5 rpm). As soon as the speed stabilizes the required volume of the sample of the appropriate acid gellant is immediately introduced into the stirred acid via a disposable syringe. Immediately after adding the gellant, any remaining material in the syringe is displaced into the acid by drawing up a full volume of acid into the syringe then displacing completely into the acid. A timer is initiated. After the appropriate duration has elapsed the stirrer is switched off and the beaker containing the gelled acid immediately removed and transferred to a Brookfield LVT Viscometer. The viscometer is pre-set with an appropriate spindle/speed combination and the viscometer is activated. A 'count-down' timer pre-set to 60 seconds is initiated. After the 60 seconds have elapsed, the viscometer reading is taken and noted. The gelled acid is then immediately removed from the viscometer and transferred back to the stirrer assembly where mixing is immediately recommenced. Steps 2 to 6 are repeated stopping the stirrer after exactly 10, 20, 30, 45 and 60 minutes of stirring have elapsed without the addition of any further acid gellant results for which are shown below in Table II.

The emulsion is tested for toxicity using Draft International Standard ISO/DIS 10253.2, ISO/TC 147/SC5, 1994-05-17. This is a 72-hour Skeletonema costatum toxicity test and the results are shown below in Table II.

Example 2

A copolymer is prepared substantially identically to the copolymer of Example 1 except that the acrylamide is added before the dimethylaminoethyl methacrylate. The emulsion is tested for hydrolysis of the copolymer by titration of acid and the results are shown below in Table II.

Comparative Example 3

A copolymer is prepared substantially identically to the copolymer of Example 1 except that a dimethylaminoethyl methacrylate quaternary ammonium salt is used instead of a dimethylaminoethyl methacrylate amine. The emulsion is tested for viscosity and toxicity, results for which are shown below in Table II.

TABLE I

| A<br>Water Soluble Components | B<br>Oil Soluble Components | C<br>Wt % |
|---|---|---|
| Ice | | 34.94 |
| Concentrated sulfuric acid | | 5.7 |
| Dimethylaminoethyl methacrylate (DMAEMA) | | 18.4 |
| Solid acrylamide | | 16.6 |
| Ethylenediaminetetraacetic acid disodium salt | | 0.04 |
| | Paraffin solvent | 21.71 |
| | Sorbitan monooleate | 1.17 |
| | Oxyethylated sorbitan monooleate | 1.17 |
| | Polymeric stabilizing surfactant* | 0.25 |
| | azobisisobutyronitrile | 0.02 |
| | | 100% |

*Hypermer B246, a trade designation of ICI.

TABLE II

| | Example 1 | Example 2 | Comparative Example 3 |
|---|---|---|---|
| % Hydrolysis | 0 | 16.7 | — |
| Viscosity | 39 | — | 42 |
| Toxicity EC50 mg/l | 23.3 | | 0.56 |

What is claimed is:

1. A method for fracturing a subterranean formation, the subterranean formation being in fluid communication with the surface through a well bore, comprising:

(a) creating a fracture in a subterranean formation; and (b) injecting into the fracture an etching agent, wherein the etching agent includes a gelled acid comprising an acid gelled using a copolymer having a backbone, the organic component of the gelled acid having the general formula:

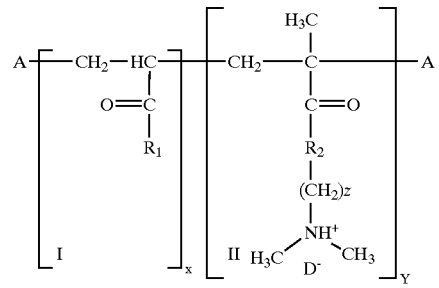

wherein:

(a) A is an H or other terminating group;

(b) $R_1$ is an OH or $NH_2$;

(c) $R_2$ is an O or NH;

(d) Z is an integer having a value of from 1 to 4;

(e) X and Y are present in a ratio (X:Y) of from 3:2 to 4:1;

(f) structures I and II are present as blocks or randomly distributed along the copolymer backbone;

(g) $D^-$ is an anion of a mineral acid; and wherein the copolymer has a molecular weight of from about 1,000,000 to about 10,000,000.

2. The method of claim 1 wherein, in the general formula for the copolymer, $R_1$ is $NH_2$.

3. The method of claim 1 wherein, in the general formula for the copolymer, Z is an integer having a value of from 2 to 3.

4. The method of claim 3 wherein, in the general formula for the copolymer, Z is an integer having a value of 2.

5. The method of claim 4 wherein the copolymer has a molecular weight of from about 1,000,000 to about 6,000,000.

6. The method of claim 1 wherein the mineral acid is selected from the group consisting of sulfuric, nitric, hydrochloric, and phosphoric acid.

7. The method of claim 6 wherein the mineral acid is selected from the group consisting of sulfuric and hydrochloric acid.

8. The method of claim 1 wherein the etching agent includes an additive selected from the group consisting of emulsifiers, chelators, surfactants, proppants, delay additives, biocides, corrosion inhibitors, and mixtures thereof.

9. The method of claim 1 wherein the etching agent includes a proppant.

10. The method of claim 1 wherein the copolymer is prepared using a formulation comprising:
    (a) a first vinyl component selected from the group consisting of acrylamide, acrylic acid, and mixtures thereof; and
    (b) a second vinyl component selected from dimethylaminoethyl methacrylate, dimethylaminoethyl methacrylamide, dimethylaminopropyl methacrylamide, and mixtures thereof;
and additionally comprising a crosslinking agent.

11. The method of claim 10 wherein the crosslinking agent is bis-acrylamide.

12. The method of claim 11 wherein the bis-acrylamide is present in a concentration of less than about 250 parts per million.

13. The method of claim 11 wherein the bis-acrylamide is present in a concentration of less than about 200 parts per million.

14. The method of claim 11 wherein the bis-acrylamide is present in a concentration of less than about 100 parts per million.

* * * * *